United States Patent
Punnappurath et al.

(10) Patent No.: US 11,416,972 B2
(45) Date of Patent: Aug. 16, 2022

(54) SYSTEM AND METHOD FOR REFLECTION REMOVAL USING DUAL-PIXEL SENSOR

(71) Applicants: Abhijith Punnappurath, North York (CA); Michael Brown, Toronto (CA)

(72) Inventors: Abhijith Punnappurath, North York (CA); Michael Brown, Toronto (CA)

(*) Notice: Subject to any disclaimer, the term of this patent is extended or adjusted under 35 U.S.C. 154(b) by 0 days.

(21) Appl. No.: 17/595,838

(22) PCT Filed: May 26, 2020

(86) PCT No.: PCT/CA2020/050712
§ 371 (c)(1),
(2) Date: Nov. 26, 2021

(87) PCT Pub. No.: WO2020/237366
PCT Pub. Date: Dec. 3, 2020

(65) Prior Publication Data
US 2022/0148137 A1    May 12, 2022

Related U.S. Application Data

(60) Provisional application No. 62/853,199, filed on May 28, 2019.

(51) Int. Cl.
*G06T 5/00* (2006.01)
*H04N 13/128* (2018.01)
(Continued)

(52) U.S. Cl.
CPC .............. *G06T 5/003* (2013.01); *G06T 7/194* (2017.01); *G06T 7/50* (2017.01); *H04N 5/23212* (2013.01);
(Continued)

(58) Field of Classification Search
USPC ............... 348/222.1; 382/154, 274, 275, 284
See application file for complete search history.

(56) References Cited

U.S. PATENT DOCUMENTS 9,900,503 B1* 2/2018 Bedi ...................... H04N 9/045
2013/0016189 A1* 1/2013 Hosaka ................ H04N 13/239
348/E13.074

(Continued)

FOREIGN PATENT DOCUMENTS

WO    2018199542 A1    11/2018

OTHER PUBLICATIONS

Sirinukulwattana et al, "Reflection Removal Using Disparity and Gradient-Sparsity Via Smoothing Algorithm", IEEE, 2015, pp. 1940-1944. (Year: 2015).*

(Continued)

*Primary Examiner* — Kathleen Y Dulaney
(74) *Attorney, Agent, or Firm* — Bhole IP Law; Anil Bhole; Marc Lampert

(57) ABSTRACT

A system and method for reflection removal of an image from a dual-pixel sensor. The image including a left view and a right view. The method including: determining a first gradient of the left view and a second gradient of the right view; determining disparity between the first gradient and the second gradient using a sum of squared differences (SSD); determining a confidence value at each pixel using the SSD; determining a weighted gradient map using the confidence values; minimizing a cost function to estimate the background layer, the cost function including the weighted gradient map, wherein the image includes the background layer added to a reflection layer; and outputting at least one of the background layer and the reflection layer.

20 Claims, 14 Drawing Sheets

(51) Int. Cl.
*G06T 7/194* (2017.01)
*H04N 13/271* (2018.01)
*H04N 5/232* (2006.01)
*G06T 7/50* (2017.01)

(52) U.S. Cl.
CPC ....... *H04N 5/23229* (2013.01); *H04N 13/128* (2018.05); *H04N 13/271* (2018.05); *G06T 2207/20021* (2013.01); *G06T 2207/20076* (2013.01); *G06T 2207/20224* (2013.01)

(56) References Cited

U.S. PATENT DOCUMENTS

| | | | | |
|---|---|---|---|---|
| 2015/0161881 A1* | 6/2015 | Takemura | .............. | G06V 20/58 348/148 |
| 2018/0197039 A1* | 7/2018 | Guerreiro | .............. | B60K 35/00 |
| 2018/0324359 A1 | 11/2018 | Pan et al. | | |
| 2019/0102872 A1* | 4/2019 | Moussa | .................... | G06T 5/50 |
| 2020/0210690 A1 | 7/2020 | Han et al. | | |

OTHER PUBLICATIONS

A Novel Reflection Removal Algorithm Using the Light Field Camera, Tingtian et al., May 27, 2018.
Reflection Removal Using a Dual-Pixel Sensor, Punnappurath et al., Jun. 15, 2019.
Robust Separation of Reflection from Multiple Images, Xiaojie et al., Jun. 23, 2014.
Written Opinion of the International Searching Authority for PCT/CA2020/050712, dated Aug. 21, 2020.
International Search Report of the International Searching Authority for PCT/CA2020/050712, dated Aug. 21, 2020.

* cited by examiner

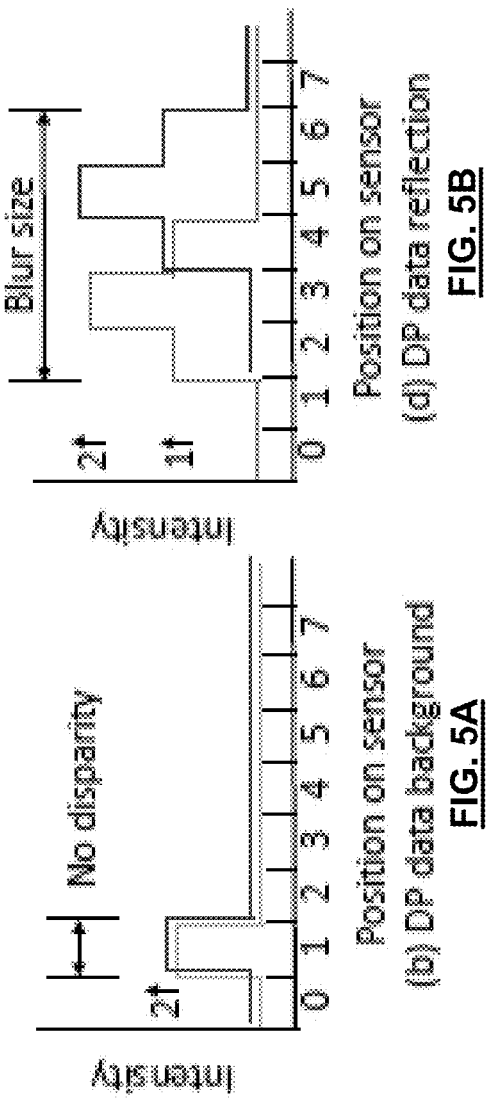
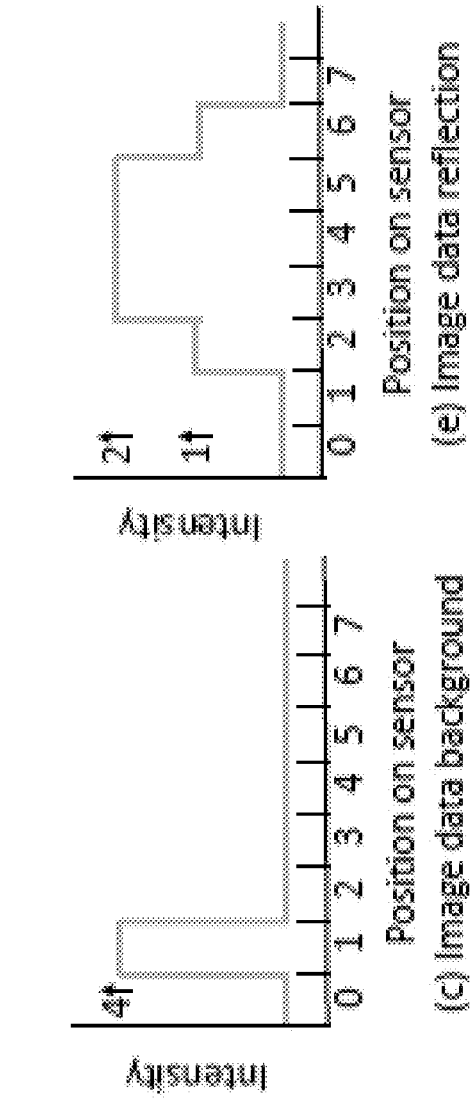

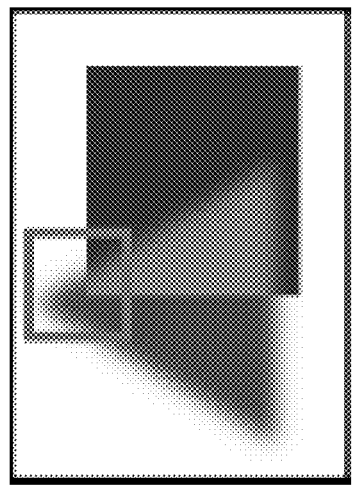
FIG. 6A
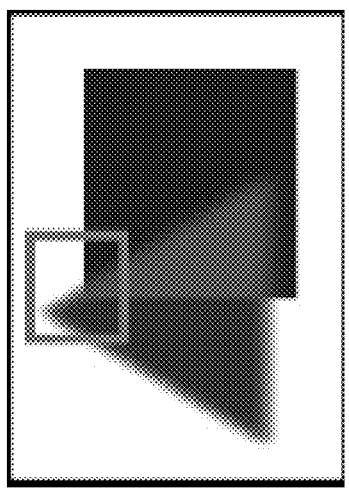
FIG. 6B
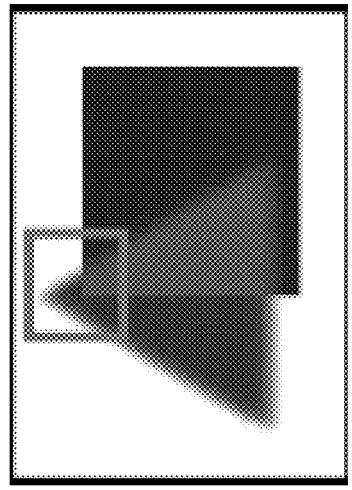
FIG. 6C
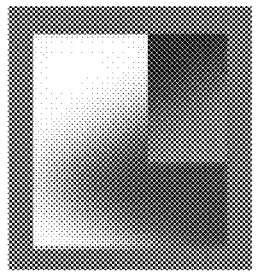
FIG. 6D
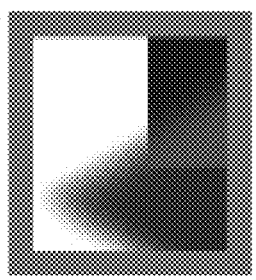
FIG. 6E
FIG. 6F

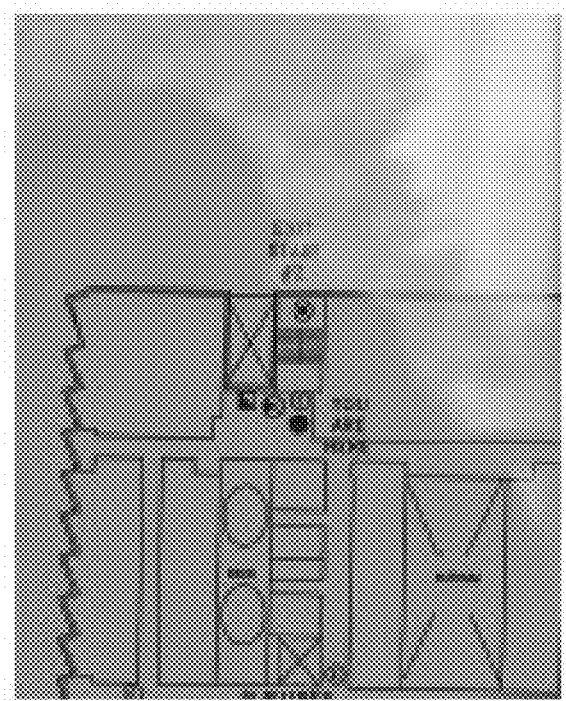
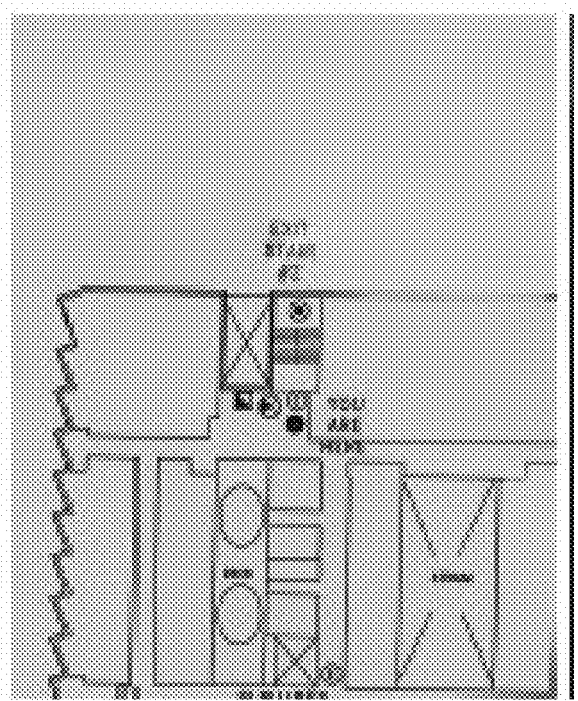
FIG. 10A　　　　　　　　　FIG. 10B
FIG. 10C　　　　　　　　　FIG. 10D

SYSTEM AND METHOD FOR REFLECTION REMOVAL USING DUAL-PIXEL SENSOR

TECHNICAL FIELD

The present disclosure relates generally to image and video capture and processing. More particularly, the present disclosure relates to a system and method for reflection removal using dual-pixel sensor.

BACKGROUND

When capturing images, such as with a camera, undesirable reflections can affect the quality of the images. For example, capturing images through glass panes can result in unwanted reflections appearing in the images. Current approaches to removing these types of image artifacts are generally inefficient or not sufficiently effective.

SUMMARY

In an aspect, there is provided a method for reflection removal of an image from a dual-pixel sensor, the image comprising a left view and a right view, the method executed on one or more processors, the method comprising: receiving a first gradient of the left view and a second gradient of the right view; determining disparity between the first gradient and the second gradient using a sum of squared differences (SSD); determining a confidence value at each pixel using the SSD; determining a weighted gradient map using the confidence values; minimizing a cost function to estimate the background layer, the cost function comprising the weighted gradient map, wherein the image comprises the background layer combined with a reflection layer; and outputting at least one of the background layer and the reflection layer.

In a particular case of the method, determining the disparity comprises selecting a patch in the gradient of one of the views and performing a horizontal search over a range of pixels in the gradient of the other view.

In another case of the method, the horizontal search comprises a one-dimensional search.

In yet another case of the method, the sum of squared differences (SSD) is determined for each of a series of integer shifts in a predetermined range.

In yet another case of the method, the weighted gradient map at a given pixel is zero if the corresponding confidence value is less than or equal to a predetermined threshold.

In yet another case of the method, the method further comprising determining a difference in sharpness between the background layer and the reflection layer by determining a probability distribution of the gradients of the reflection layer.

In yet another case of the method, the method further comprising determining a probability distribution of the gradients of the background layer.

In yet another case of the method, the cost function comprises a product of the probabilities of the probability distribution of the gradients of the reflection layer and the probability distribution of the gradients of the background layer.

In yet another case of the method, the cost function comprises:

$$\operatorname{argmin}_b \{\|Db\|_p^p + \lambda \|CD(g-b)\|_2^2\},$$

wherein b is the background layer, g is the image, $\|Db\|_p^p$ is a matrix for the gradient distribution of the background layer, $\lambda$ is a parameter to control an amount of defocus blur in the reflection layer, and C is a matrix encoding the weighted gradient map of the background layer.

In yet another case of the method, the method further comprising subtracting the background layer from the left view and the right view and determining a coarse depth map of the reflected layer by using the subtracted left view and the subtracted right view.

In another aspect, there is provided a system for reflection removal of an image from a dual-pixel sensor, the image comprising a left view and a right view, the system comprising one or more processors in communication with a memory storage, the one or more processors configured to execute: a gradient module to receive a first gradient of the left view and a second gradient of the right view; a comparison module to determine disparity between the first gradient and the second gradient using a sum of squared differences (SSD), determine a confidence value at each pixel using the SSD, and determine a weighted gradient map using the confidence values; a layer separation module to minimize a cost function to estimate the background layer, the cost function comprising the weighted gradient map, wherein the image comprises the background layer combined with a reflection layer; and an output module to output at least one of the background layer and the reflection layer.

In a particular case of the system, determining the disparity comprises selecting a patch in the gradient of one of the views and performing a horizontal search over a range of pixels in the gradient of the other view.

In another case of the system, the horizontal search comprises a one-dimensional search.

In yet another case of the system, the sum of squared differences (SSD) is determined for each of a series of integer shifts in a predetermined range.

In yet another case of the system, the weighted gradient map at a given pixel is zero if the corresponding confidence value is less than or equal to a predetermined threshold.

In yet another case of the system, the layer separation module further determines a difference in sharpness between the background layer and the reflection layer by determining a probability distribution of the gradients of the reflection layer.

In yet another case of the system, the layer separation module further determines a probability distribution of the gradients of the background layer.

In yet another case of the system, the cost function comprises a product of the probabilities of the probability distribution of the gradients of the reflection layer and the probability distribution of the gradients of the background layer.

In yet another case of the system, the cost function comprises:

$$\operatorname{argmin}_b \{\|Db\|_p^p + \lambda \|CD(g-b)\|_2^2\},$$

wherein b is the background layer, g is the image, $\|Db\|_p^p$ is a matrix for the gradient distribution of the background layer, $\lambda$ is a parameter to control an amount of defocus blur in the reflection layer, and C is a matrix encoding the weighted gradient map of the background layer.

In yet another case of the system, the system further comprising a depth module to subtract the background layer from the left view and the right view and determine a coarse depth map of the reflected layer by using the subtracted left view and the subtracted right view.

These and other aspects are contemplated and described herein. It will be appreciated that the foregoing summary sets out representative aspects of systems and methods to assist skilled readers in understanding the following detailed description.

BRIEF DESCRIPTION OF THE DRAWINGS

The features of the invention will become more apparent in the following detailed description in which reference is made to the appended drawings wherein:

FIGS. 5A to 5D illustrates graphs of various example positions of light received on the image sensor of the dual-pixel camera of FIG. 4;

FIG. 6A shows an example left view captured by the dual-pixel camera of FIG. 4;

FIG. 6B shows an example right view captured by the dual-pixel camera of FIG. 4;

FIG. 6C shows an example observed image captured by the dual-pixel camera of FIG. 4;

FIG. 6D shows an enlarged area of the example of FIG. 6A;

FIG. 6E shows an enlarged area of the example of FIG. 6B;

FIG. 6F shows an enlarged area of the example of FIG. 6C;

FIG. 10A shows an example input image;

FIG. 10B shows an estimated background of the example input image of FIG. 10A determined by the system of FIG. 1;

FIG. 10C shows an estimated reflection of the example input image of FIG. 10A determined by the system of FIG. 1; and FIG. 10D shows a depth map of the reflection layer determined by the system of FIG. 1.

DETAILED DESCRIPTION

Figure 1:
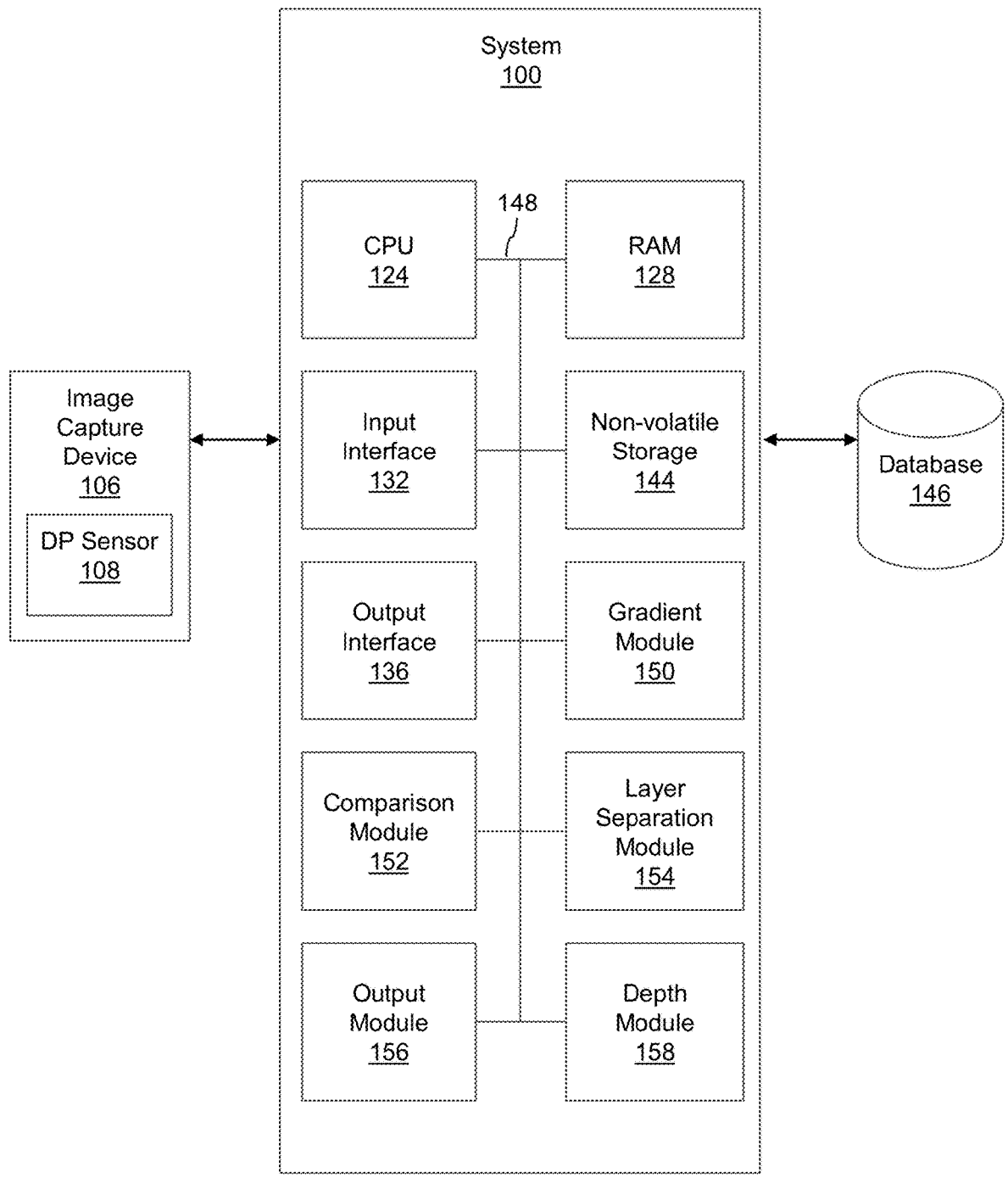
FIG. 1 is a block diagram of a system for reflection removal, in accordance with an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to image and video capture and processing. More particularly, the following relates to a system and method for reflection removal.

While the following describes a camera that captures an image, it is to be understood that any suitable image or video capture device and/or sensor can be used. For example, a DSLR camera, a camera on a smartphone, a video-camera, a webcam, a camera capturing light outside of the visible spectrum, or the like can be used.

Embodiments of the present disclosure address the technical problem of removing reflection interference that occur when imaging a scene behind a pane of glass by, for example, using information available from dual-pixel (DP) sensors. Such sensors are generally located on most smartphone and DSLR cameras. Traditional image sensors have a single photodiode per pixel site. DP sensors have two photodiodes that effectively split the pixel in half. The DP sensor design furnishes, from a single captured image, two views of the scene where rays passing through the left side of the lens are captured by the right half-pixels (right sub-aperture view) and those passing through the right side of the lens are captured by the left half-pixels (left sub-aperture view). The DP sensor is effectively a two-sample light-field camera. Within this context, scene points that are in-focus will generally have no difference between their positions in the left and right sub-aperture views. However, out-of-focus scene points will generally be blurred in opposite directions in the two sub-aperture views, resulting in very small but detectable shifts. These shifts, which are referred to herein as defocus-disparity cues, are related to the amount of out-of-focus blur incurred by the scene point with respect to the camera lens's depth of field. These defocus-disparity cues, which have been determined to be a by-product of the DP sensor, allow for robustly determining which gradients in the captured composite image belong to the in-focus background layer.

Figure 3:
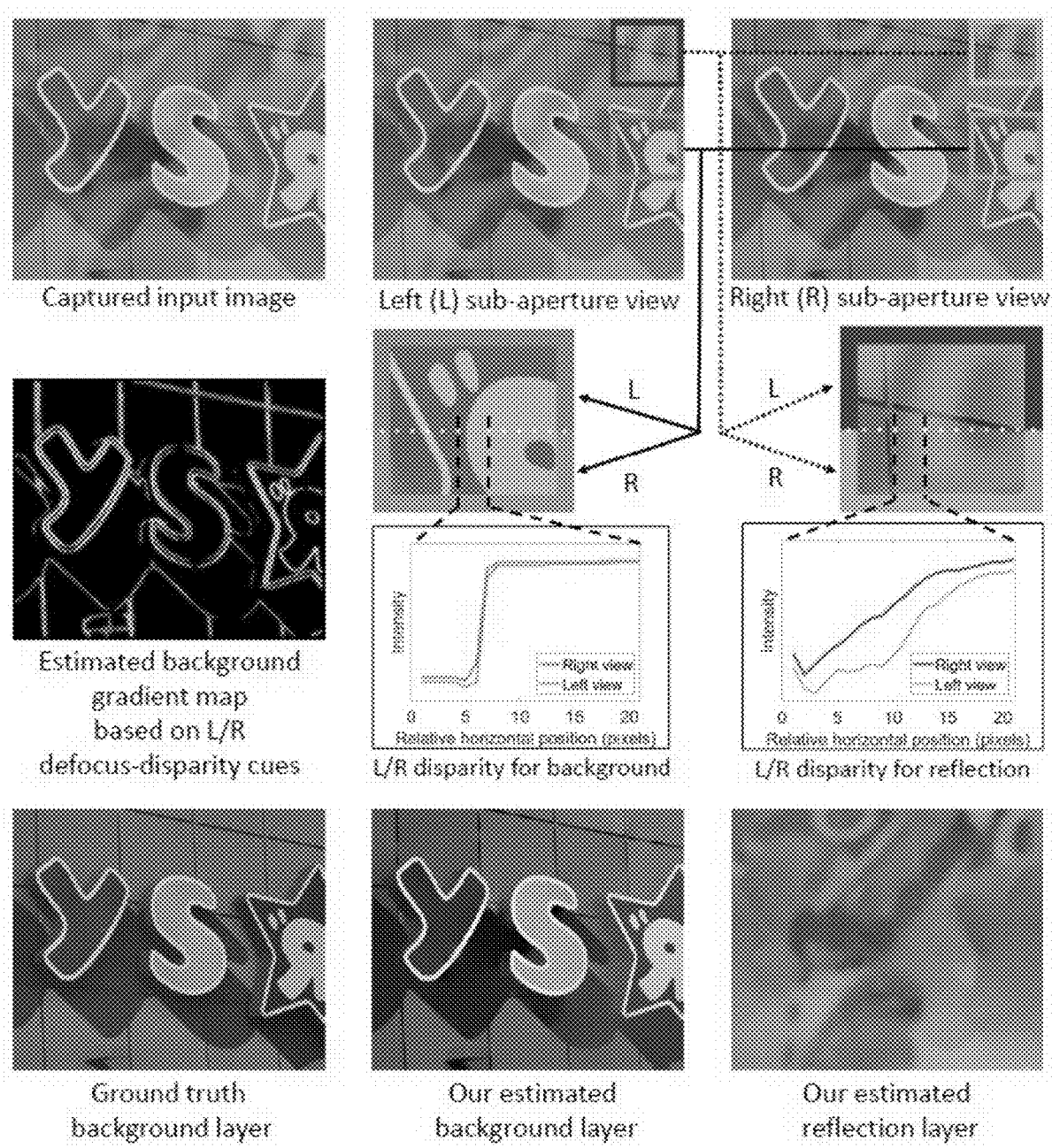
FIG. 3 shows an illustrative example using the system of FIG. 1.

FIG. 3 shows an example of the present embodiments. The captured image and its two sub-aperture views are shown. In the zoomed-in boxes, the upper half corresponds to the left view, and the lower half to the right. In the box on the right showing an out-of-focus reflection region, a horizontal shift can be observed between the two white dots (best viewed electronically and zoomed), while no disparity exists in the left box of an in-focus background region. This disparity (illustrated in the plots) allows the system of the present embodiments to determine a mask for image gradients belonging to the background region that can be used to extract the background layer.

Advantageously, the present embodiments provide a reflection removal approach that exploits the two sub-aperture views available on a DP sensor. In this way, the system of the present embodiments can use a relationship between defocus-disparity cues in two sub-aperture views with respect to a background layer and objects reflected by a glass. In these embodiments, defocus-disparity cues can be used to detect gradients corresponding to the in-focus background and incorporate them into an optimization framework to recover the background layer. The present inventors conducted example experiments that demonstrated the substantial advantages of using this additional information when compared with other approaches. In addition, as part of various embodiments, a dataset for reflection removal is determined that provides access to the two sub-aperture views.

Most other approaches to reflection removal for single images exploit the statistics of natural images to make the reflection removal problem less ill-posed. For example, long-tail distribution of gradients, sparsity of corners and edges, the ghosting effect, difference in smoothness between the background and reflection layers, and depth of field confidence maps are some of the approaches that have been employed. Additionally, deep learning techniques have also been applied to this task. Although approaches are present for single-image reflection removal, these approaches generally leave a large margin for improvement due to the highly ill-posed nature of the problem.

In some cases, capturing multiple images of a scene in a pre-defined manner can make the reflection removal problem more tractable. The vast majority of other approaches using multiple images are based on motion cues. These approaches generally take advantage of the difference in motion between the two layers given images of the same scene taken from different viewpoints. Approaches that require specialized hardware or non-conventional capture settings have also been used, for example, using a polarizer, varying focus, capturing a flash no-flash pair, and the like. Although these multi-image approaches can attend to the reflection problem due to the availability of additional information, they generally place the burden on the photographer to acquire special hardware or skills, and thereby vastly limit their applicability to lay users.

While layer separation may be ill-posed with conventional imaging, it may become tractable with light field imaging. For example, using a camera array to obtain an image stack for reflection removal. Other approaches include a variational approach for layer separation assuming user assistance in gradient labeling, a deep learning approach to recover the scene depth as well as the two layers, focus manipulation to remove the reflections, and the like. However, generally these approaches need specialized light field cameras. The present embodiments, in contrast, use information available on DP sensors which are available on a large percentage of current consumer cameras.

Turning to FIG. 1, shown therein is a diagram for a system for reflection removal using a dual-pixel sensor 100, in accordance with an embodiment. The system 100 can include a number of physical and logical components, including a central processing unit ("CPU") 124, random access memory ("RAM") 128, an input interface 132, an output interface 136, memory comprising non-volatile storage 144, and a local bus 148 enabling CPU 124 to communicate with the other components. CPU 124 can include one or more processors. RAM 128 provides relatively responsive volatile storage to CPU 124. The input interface 132 enables a user to provide input via, for example, a touchscreen. The output interface 136 outputs information to output devices, for example, to the touchscreen. Non-volatile storage 144 can store computer-executable instructions for implementing the system 100, as well as any derivative or other data. In some cases, this data can be stored or synced with a database 146, that can be local to the system 100 or remotely located (for example, a centralized server or cloud repository). During operation of the system 100, data may be retrieved from the non-volatile storage 144 and placed in RAM 128 to facilitate execution. In an embodiment, the CPU 124 can be configured to execute various modules, for example, a gradient module 150, a comparison module 152, a layer separation module 154, an output module 156, and a depth module 158.

In an embodiment, the system 100 can be located on an image capture device 106; such as a camera or smartphone. In this case, the system can be implemented, for example, with general or specialized computing components, or with a system-on-chip (SoC) implementation. In other cases, the system 100 can be located separate or remote from the image capture device 106. In this case, the system 100 may receive the image from the database 146 or via a network, for example, the Internet. The image capture device 106 including a dual-pixel sensor 108.

Generally, dual-pixel sensors were developed to provide a fast method for autofocus, the idea being that by examining the image disparity between the two views, a change in lens position can be calculated to minimize the amount of out-of-focus blur, thus focusing the image. A DP sensor can split a single pixel in half using an arrangement of a microlens sitting atop two photodiodes. For example, see the example diagram illustrated in FIG. 4. The two halves of the dual-pixel, the two photodiodes, can detect light and record signals independently. When the two signals are summed together, the pixel intensity that is produced can match the value from a normal single diode sensor. The split-pixel arrangement has the effect that light rays from the left half of the camera lens's aperture will be recorded by the right half of the dual-pixel, and vice versa.

A scene point that is out of focus will generally experience a disparity or shift between the left and right views due to the circle of confusion that is induced. This shift can be exploited by DP auto-focus approaches. By examining the signed average disparity value within a region of interest, the auto-focus algorithm can determine not only in which direction to move the lens in order to bring that region into focus (and thereby minimize disparity) but also by how much.

The system 100 can use an image formation model for a DP sensor 108 imaging a scene through a transparent glass. In a particular case, a dense DP sensor array effectively yields views through the left and right halves of the lens from a single capture. Depending on the sensor's orientation, this can also be the upper and lower halves of the lens or any other orientation of a two-way segmentation of the lens; without loss of generality, such orientations can be considered the left and right views for the purposes of this disclosure.

In some cases, the system 100 can assume a background layer has predominately stronger image intensity than a reflection layer and/or that background scene content lies within the depth of field (DOF) of the camera, while the objects in the scene being reflected on the glass are at a different depth and therefore outside the DOF. In this way, the captured image is a superposition of the in-focus background and a de-focused reflection.

Figure 4:
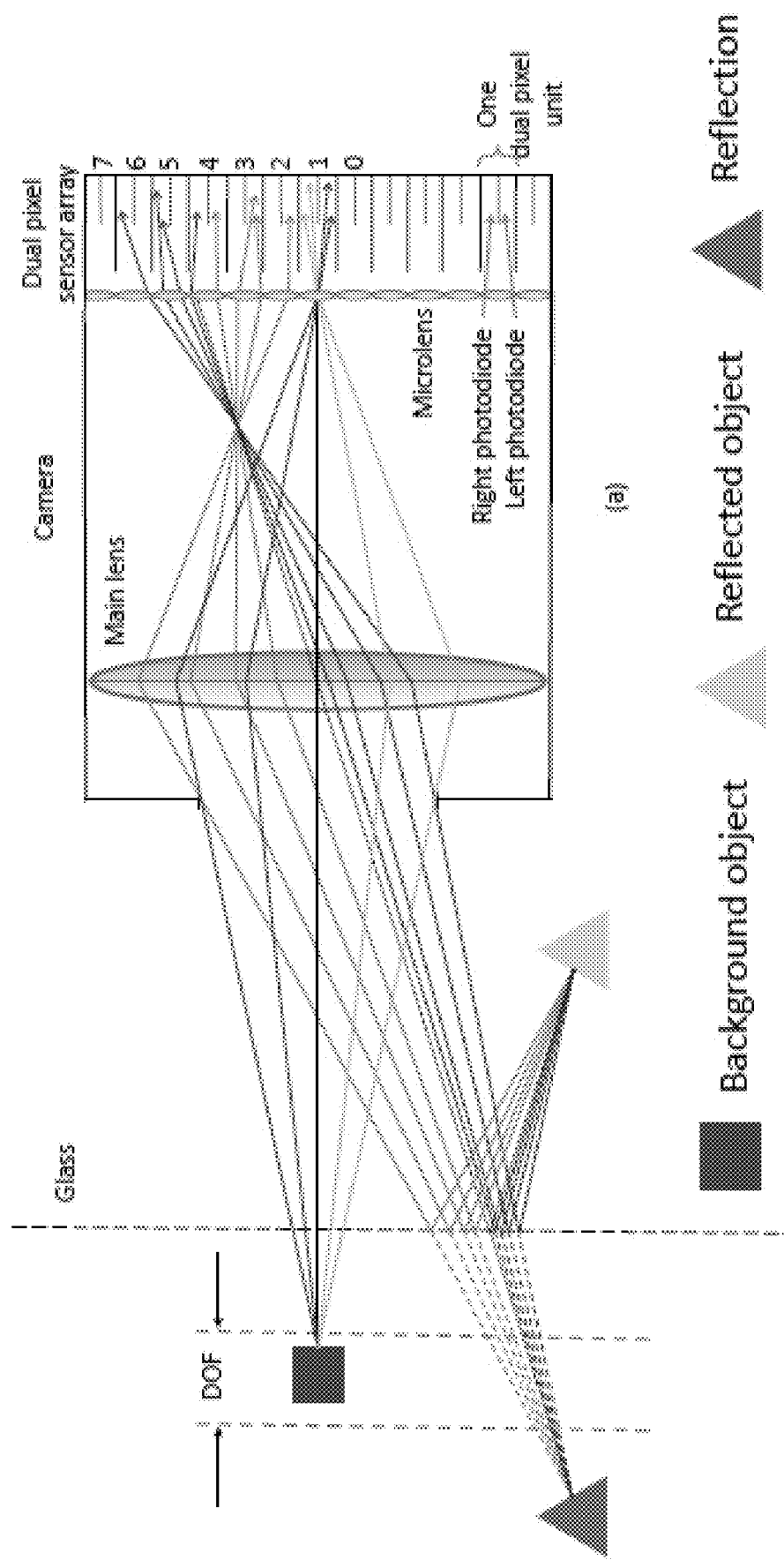
FIG. 4 shows an example of image formation using a dual-pixel camera.

Based on the above, the example diagram of FIG. 4 illustrates an example of image formation for a DP camera imaging a scene through glass. A point on the in-focus background object emits light that travels through the camera's lens and is focused on the sensor at a single pixel (labeled as 1). Observe from the figure that rays that generally pass through the right half of the main lens aperture hit the microlens at an angle such that they are directed into the left half-pixels. The same generally applies to the left half of the aperture and the right half-pixels. For an in-focus scene point, there is generally no disparity (for example, as illustrated in the chart of FIG. 5A). The sum of the left and right values is stored as the image intensity at that pixel (for example, as illustrated in the chart of FIG. 5C).

For the diagram of FIG. 4, also consider the triangular object in front of the glass that constitutes the reflection layer. Light from a point on this object focuses in front of the sensor, and, in this example, produces a five-pixel wide (labeled 2 to 6) defocus-blurred image on the sensor. The left and right views created by the split-pixels have a disparity that is proportional to the blur size (for example, as illustrated in the chart of FIG. 5B). The blurred reflection image can be obtained by summing up the left and right signals (for example, as illustrated in the chart of FIG. 5D). An example of composite DP data that is the sum of the in-focus background (with no disparity) and the out-of-focus reflection (with a non-zero disparity) as observed from the left and right views over the entire imaging sensor is shown in FIGS. 6A and 6B. Notice the shift between views as highlighted by the zoomed-in regions shown in FIGS. 6D and 6E. An example of a final image output by the camera that is the sum of left and right DP views is also shown in FIG. 6C, and its zoomed-in region in FIG. 6F.

If b represents the background layer and f denotes the latent sharp reflection layer, both in lexicographically ordered vector form, the composite left $g_{LV}$ and right $g_{RV}$ DP views can be expressed mathematically as $$g_{LV} = \frac{b}{2} + W_{LV}f, \; g_{RV} = \frac{b}{2} + W_{RV}f,$$

where $W_{LV}$ and $W_{RV}$ are matrices that multiply the underlying sharp reflection layer f to produce its defocused and shifted versions of half intensity in the left and right views, respectively. The observed image g can be expressed as $g=g_{LV}+g_{RV}=b+r$, where r equals the blurred reflection layer and is given by $r=(W_{LV}+W_{RV})f$.

In the present embodiments, the present inventors determined that, advantageously, defocus-disparity cues between the left and right DP views can be used to automatically identify which gradients of the input image belong to the background layer.

Figure 2:
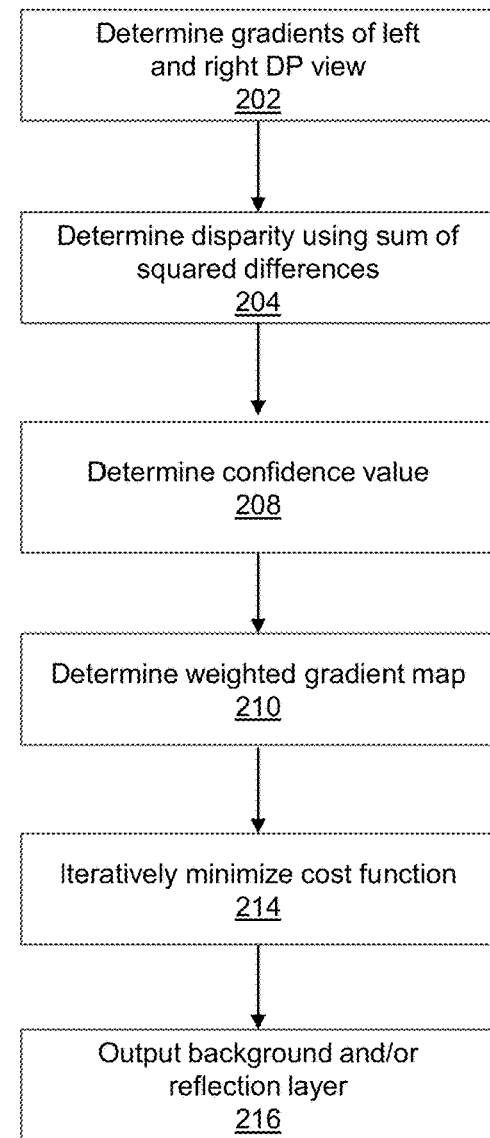
FIG. 2 is a flowchart of a method for reflection removal, in accordance with an embodiment.

Turning to FIG. 2, shown therein is a flowchart for a method for reflection removal of an image from a dual-pixel sensor 200, in accordance with an embodiment. The image comprising a left view and a right view from the dual-pixel sensor. At block 202, the gradient module 150 determines gradients of a left and a right DP view, represented as $H_{LV}$ and $H_{RV}$ respectively. While these views are referred to as 'left' and 'right', it is understood that this terminology is merely convention and any suitable dual-pixel arrangement is contemplated. In some cases, these gradients can be obtained by applying first-order horizontal and vertical derivative filters. In some cases, at block 202, the gradient module 150 can receive the gradients of the left and the right DP view; for example, receiving them from memory (the database 146, the non-volatile storage 144, or the RAM 128) after having been determined by the gradient module 150, receiving them as input from other systems, or receiving them as input from a user.

At block 204, the comparison module 152 can determine disparity, for example, by selecting a patch of size N×N pixels in $H_{LV}$ and performing a horizontal search over a range of −t to t pixels in $H_{RV}$. In some cases, a one-dimensional search may suffice because the split-pixels can produce a generally horizontally rectified disparity in a reference frame of the image sensor. In some cases, a search interval 2t+1 can be restricted to a few pixels because the baseline between DP views is generally very narrow (approximately equal to aperture diameter). The comparison module 152 determines a sum of squared differences (SSD)

for each integer shift. In an example, SSD (S) values at integer shifts, for example with q=−t to t, can be determined using:

$$S(q) = \sum_{x=1 \text{ to } N} \sum_{y=1 \text{ to } N} (H_{LV}(x, y) - H_{RV}(x+q, y))^2$$

where x, y represents horizontal and vertical axes respectively.

In an example, a minimum of the 2t+1 points are determined and the quadratic $$\frac{1}{2}a_1 x^2 + a_2 x + a_3$$

is fit to the SSD value using the minimum and, in some cases, points that surrounding the minimum (for example, two surrounding points). At a given pixel i, the location of the quadratic's minimum $$s_i = \frac{-a_2}{a_1}$$

can serve as a sup-pixel aisparity. In addition, at block 208, the comparison module 152 can determine a confidence value $\beta_i$ at each pixel i can as:

$$\beta_i = \exp\left(\frac{\log|a_{1_i}|}{\sigma_{a_1}} - \frac{a_{3_i}}{\sigma_{a_3}^2}\right).$$

At block 210, the comparison module 152 can determine a weighted gradient map $c_i$ of the background using the confidence values $\beta_i$. In some cases, the weighted gradient map at a given pixel is zero if the corresponding confidence value is less than or equal to a predetermined value. In an example:

$$c_i = \begin{cases} \rho \beta_i & \text{if } |s_i| < \varepsilon \text{ and } \beta_1 > 1, \\ 0 & \text{otherwise.} \end{cases}$$

Figures 7A, 7B:
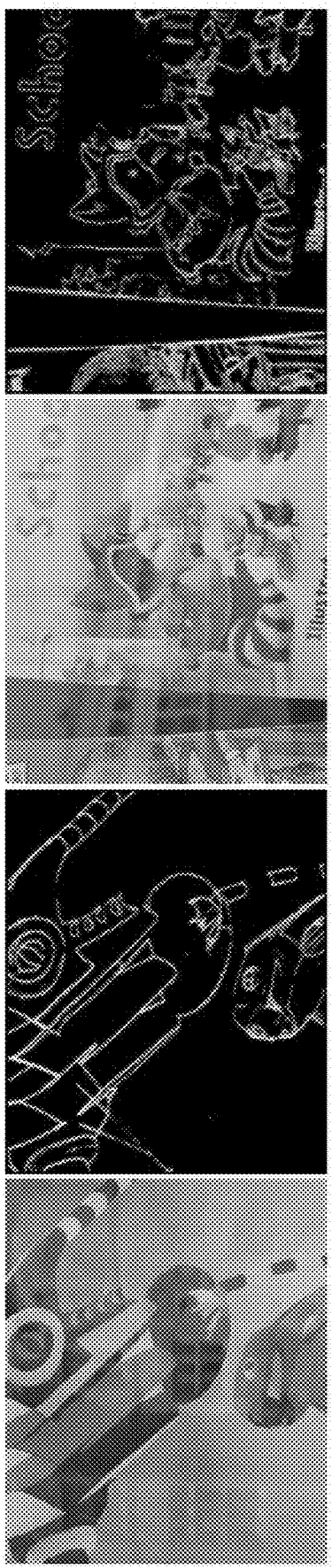
FIGS. 7A and 7B each show an example of an input image and an estimated weighted gradient map of a background determined using the system of FIG. 1.

Two examples of estimated background gradient maps are shown in FIGS. 7A and 7B; showing input images next to an estimated weighted gradient map of the background.

For purposes of illustration, in examples illustrated herein, the values of ρ=5, N=11, t=5, $\sigma_{a_1}$=5, and $\sigma_{a_3}$=256 are used; however, any suitable values can be used. In some cases, where blurred reflection gradients are weak and very few can be reliably labeled, there may not be improvement in the results by adding labeled reflection gradients to the cost function, and therefore, they can be excluded from the gradient map.

In some cases, the layer separation module 154 can be used to determine a difference in sharpness between the background and reflection layers for determining layer separation. Generally, a defocused reflection layer has fewer large gradients than an in-focus background layer. Accordingly, the layer separation module 154 can determine a gradient distribution of a blurred reflection layer by using a Gaussian function with a narrow spread as:

$$P_R(l) = \frac{1}{\sqrt{2\pi\sigma^2}} e^{-\frac{l^2}{2\sigma^2}},$$

where l represents the gradient value, and σ denotes the standard deviation of the Gaussian.

Generally, gradients of natural images have a heavy-tailed distribution, and the layer separation module 154 can model this distribution using a hyper-Laplacian function. Therefore, the layer separation module 154 can further determine the probability distribution of the gradients of the in-focus background layer as:

$$P_B(l) = e^{-\alpha|l|^p},$$

where α is a positive scalar. In an example, p can be equal to $$\frac{2}{3}.$$

At block 214, the layer separation module 154 can use a cost function that uses a probabilistic model to seek the most likely explanation of the superimposed image using the probabilities of the background and reflection layers. For example, maximizing a joint probability P(b, r). Assuming that the background and the reflection are independent, the joint probability can be expressed as the product of the probabilities of each of the two layers—that is, P(b, r)=P(b)P(r). A distribution over both background and reflection layers can be expressed using the histogram of derivative filters as:

$$P(z) \approx \prod_{i,k} P((D_k z)_i), z = \text{either } b \text{ or } r,$$

where it can be assumed that the horizontal and vertical derivative filters $D_k \in \{D_x, D_y, D_{xx}, D_{xy}, D_{yy}\}$ are independent over space and orientation.

Maximizing P(b, r) is equal to minimizing its negative log, and using the above, the following cost function can be obtained:

$$\text{argmin}_{b,r} \left\{ \sum_{i,k} (|(D_k b)_i|^p + \lambda((D_k r)_i)^2) \right\},$$

where the relative weight between the two terms and the multiplier $$\frac{1}{2\alpha\sigma^2}$$

can be integrated into a single parameter λ, which controls the amount of defocus blur in the reflection layer. This can be rewritten as:

$$\mathrm{argmin}_{b,r}\{\|Db\|_p^p + \lambda \|Dr\|_2^2\},$$

where the matrix D is a gradient operator and it consists of the five $D_k$s vertically stacked. In this way, the $\|Db\|_p^p$ term enforces that the gradient distribution of the estimated background layer is to be hyper-Laplacian and the $\|Dr\|_2^2$ term enforces that the gradient distribution of the estimated reflection layer is to be Gaussian. The confidence values are used to construct the matrix C=diag ($c_i$), which encodes the weighted gradient map of the background layer. In this way, the entries of matrix C are used to express confidence that the gradient at a particular pixel i in the image belongs to the background layer. Expressing in terms of a single layer b, and incorporating the matrix C described above to enforce agreement with the labeled gradients, the following final cost function can be obtained as:

$$\mathrm{argmin}_b\{\|Db\|_p^p + \lambda \|CD(g-b)\|_2^2\}.$$

Minimizing the above cost function can yield an estimate of the background b layer. The minimization can use, for example, iterative reweighted least squares (IRLS). In further cases, other suitable regression techniques can be used. In some cases, as in the above equation, weighting the term D(g−b) with the matrix C results in imposing a higher weight or value to gradients of those pixels which have a high confidence of belonging to the background layer. Minimizing the weighted term $\|CD(g-b)\|_2^2$ more strongly encourages such pixels with high confidence of belonging to the background to be present in the estimated background layer b. Accordingly, using matrix C can force agreement with the estimated weighted gradient map of the background, and improve reflection removal output. Since the input image equals the background layer plus the reflection layer, i.e., g=b+r, for ease of computation, the final cost function can be expressed as a function of a single variable b. The reflection layer r can be determined accordingly as g−b. In this way, a better estimate of b automatically implies a better estimate of r since the two are coupled by the equation r=g−b.

To find the minimization using IRLS, the layer separation module 154 can perform block 214 iteratively; for example, for a predetermined number of iterations. In further examples, other approaches to evaluating a condition for ending the iterations can be used; for example, terminating the iterations when a difference between a current estimate and a previous estimate is below a certain threshold. In this way, for each iteration of the above, estimates of the background layer and the reflection layer can be scrutinized to meet specific conditions; for example:
  (i) whether the gradient distribution of the estimated background layer is hyper-Laplacian;
  (ii) whether the gradient distribution of the estimated reflection layer is Gaussian; and
  (iii) whether gradients of the estimated background layer are in agreement with an estimated weighted gradient map.

At block 216, the output module 156 can output the in-focus background layer. In some cases, the output module 156 can output the reflection layer, or both layers.

In some approaches, different distributions on the gradients of the two layers can be applied. However, generally in these cases, even the background's gradient distribution is modelled using a Gaussian. In these cases, then the distribution is forced to have a tail by applying the max operator and preventing the gradients from getting close to zero. In contrast, the present embodiments can use the hyper-Laplacian distribution, which generally more naturally encourages large gradients in the background. Furthermore, other approaches may rely purely on relative smoothness, and in this way, may fail in cases where there is not a clear difference in sharpness between the two layers (for example, see FIG. 8A). Advantageously, the present embodiments can assimilate additional information about the gradients using disparity as a cue, and yield stable performance even when the reflection layer is only slightly out-of-focus.

In example experiments conducted by the present inventors, optimization was found to converge quickly within a few iterations. Since the cost function can be based purely on gradients, the recovered background and reflection images can be rescaled based on an intensity range of the input image.

In an illustrative example of the present embodiments, the system 100 can use the following summarized approach for reflection removal:

Input: : Input image g, the left $g_{LV}$ and right $g_{RV}$ DP views, relative weight λ, maximum iterations Q.
Output: : Background b, and blurred reflection r.
  Compute C using $g_{LV}$ and $g_{RV}$
  $D_* = CD$
  $q = 0$
  $b = (D^T D + \lambda D_*^T D_*)^{-1} (\lambda D_*^T D_* g)$
  do
    $e_i = (\max(|(Db)_i|, 0.001))^{(p-2)}$
    $E = \mathrm{diag}(e_i)$
    $b = (D^T E D + \lambda D_*^T D_*)^{-1} (\lambda D_*^T D_* g)$
    $q++$
  while $q < Q$
  $r = g - b$ In certain cases of the present embodiments, the approach used generally does not include any explicit image fidelity terms based on the image formation model inside the cost function. The defocus blurring operation encoded by the matrices $W_{LV}$ and $W_{RV}$ can be space-varying depending on the depth of the reflected object. Generally, a per-pixel-varying defocus kernel is hard to reliably estimate from the composite image. Moreover, the blur size is a function of aperture. Advantageously, the cost function used in the present embodiments can be based on gradients, is not aperture-specific, does not entail complex per-pixel depth estimation, and is relatively efficient to optimize.

The present embodiments allow reflection removal by advantageously exploiting data available on a DP sensor. In this way, defocus-disparity cues present in two sub-aperture views can be used to simplify the task of determining which image gradients belong to the background layer. This well-labeled gradient map allows optimization to recover the background layer more accurately than other approaches that do not use this additional information. Advantageously, the present embodiments generally do not require hardware modifications or costly training; instead it uses data generally already available within each camera image capture.

The present inventors conducted example experiments to illustrate the substantial effectiveness of the present embodiments. In these example experiments, a Canon EOS 5D Mark IV DSLR camera was used to capture the experimental dataset because it provided access to the image sensor's DP data.

Figure 8A:
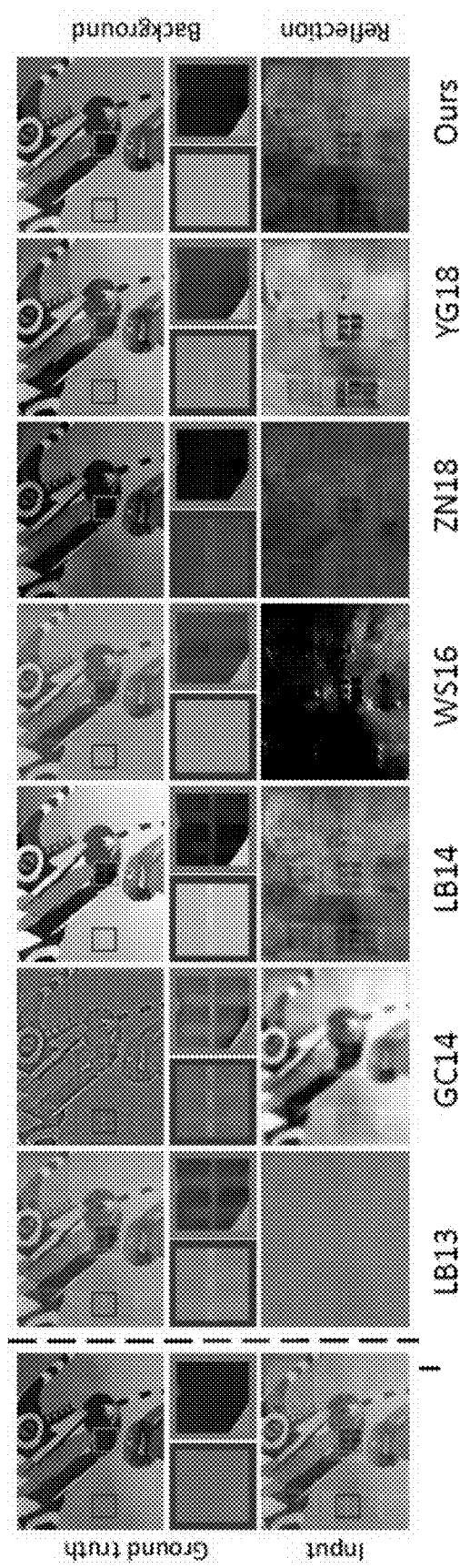
FIG. 8A illustrates a comparison of the system of FIG. 1 to other approaches for an example experiment using a controlled dataset and an F13 aperture value.
Figure 8B:
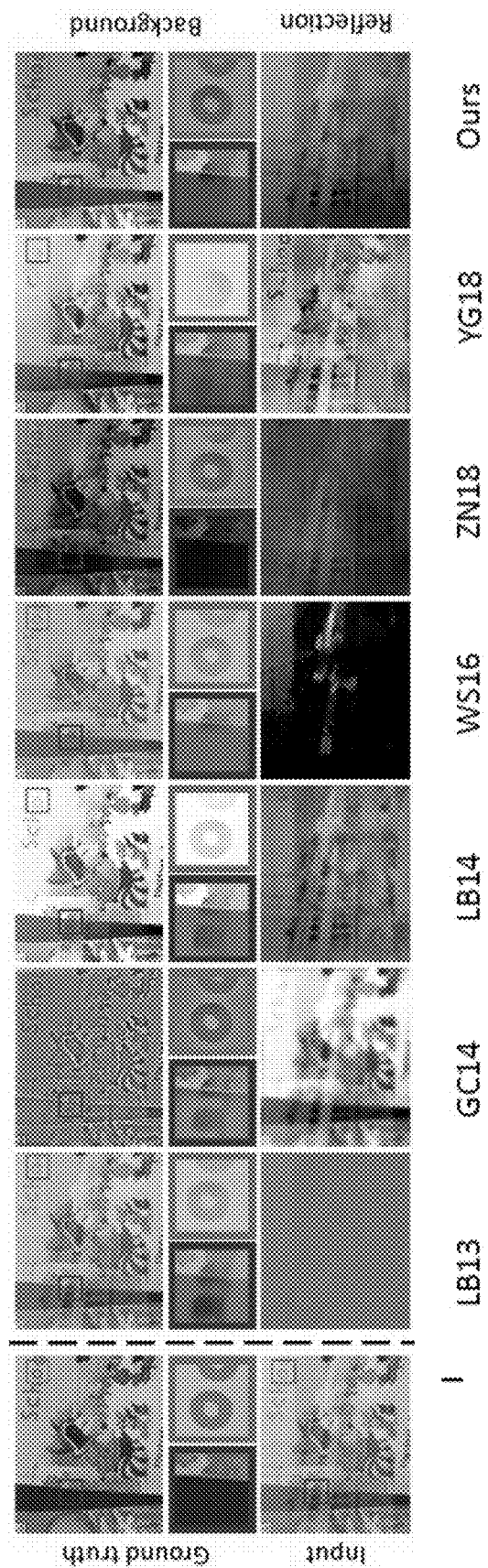
FIG. 8B illustrates a comparison of the system of FIG. 1 to other approaches for another example experiment using the controlled dataset and an F8 aperture value.
Figure 8C:
FIG. 8C illustrates a comparison of the system of FIG. 1 to other approaches for another example experiment using the controlled dataset and an F4 aperture value.
Figure 9A:
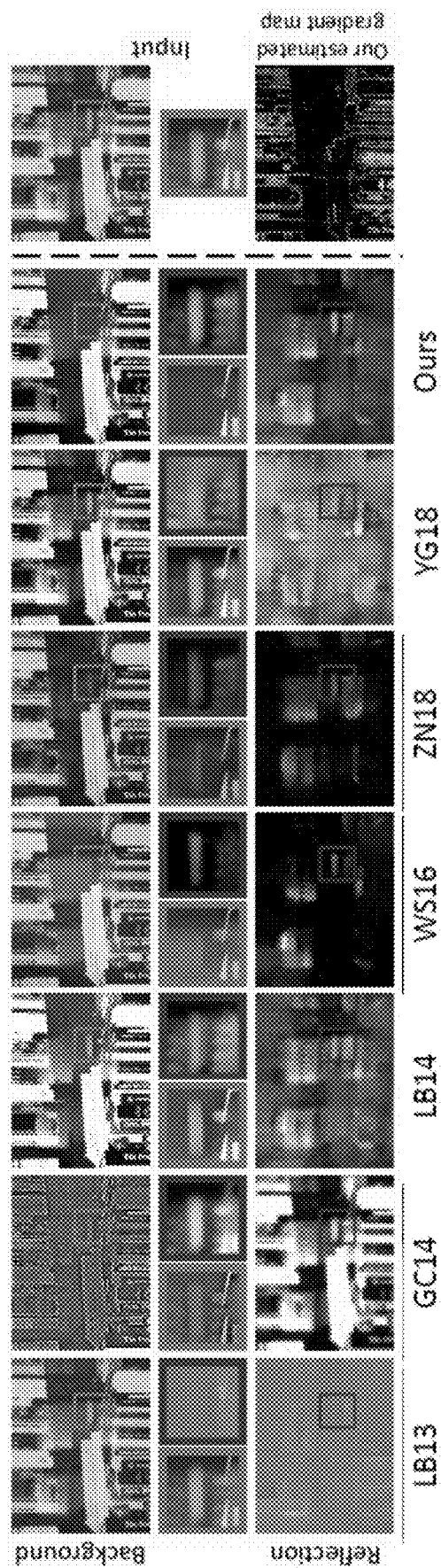
FIG. 9A illustrates a comparison of the system of FIG. 1 to other approaches for an example experiment using an "in-the-wild" dataset.
Figure 9B:
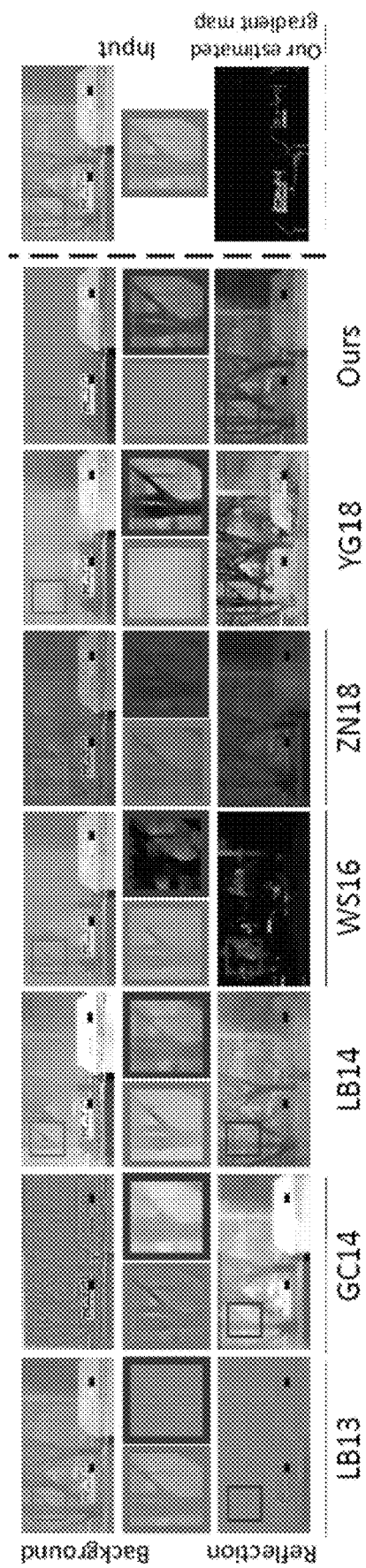
FIG. 9B illustrates a comparison of the system of FIG. 1 to other approaches for another example experiment using the "in-the-wild" dataset.
Figure 9C:
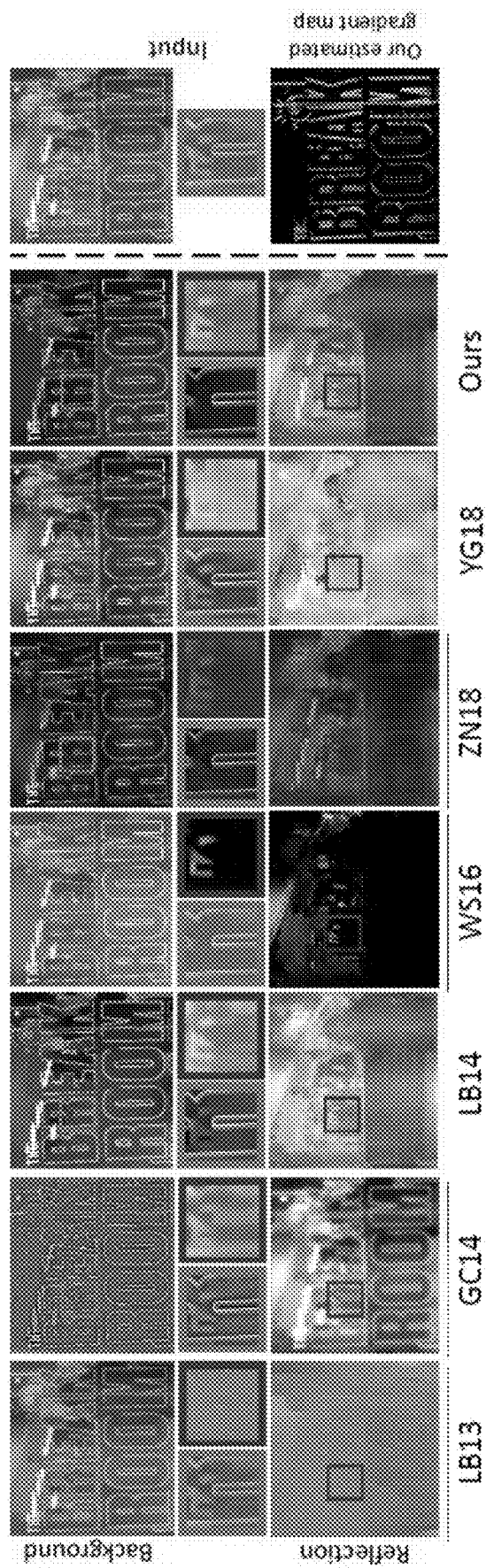
FIG. 9C illustrates a comparison of the system of FIG. 1 to other approaches for another example experiment using the "in-the-wild" dataset.

For the example experiments, the dataset was divided into two categories: 1) controlled indoor scenes with ground truth (as exemplified in FIGS. 8A to 8C); and 2) scenes captured "in the wild" (as exemplified in FIGS. 9A to 9C). Different postcards were used as background and reflection (see the examples of FIGS. 8A to 8C) for the controlled dataset. Postcards with textures ranging from medium to high were selected for both background and reflection; and combined pair-wise in a manner that provides a wide diversity of complex overlapping textures. In particular, six postcards for background and five postcards for reflection were selected, for a total of 30 different scenes.

Generally, the defocus blur size and the disparity are functions of the aperture of the image capture device. To evaluate robustness to degree of defocus blur and extent of disparity, the aperture value was also varied. Specifically, five different aperture sizes {F13, F10, F8, F5.6, F4} were selected. For each of the 30 scenes, images were captured using these five different apertures, giving a total of 150 images for the controlled dataset. In order to make the controlled scenes even more challenging, a light source was placed close to the postcard in front of the glass to boost the interference from the reflection. The ground truth background layer is captured with the glass pane removed.

While a controlled setup allows for a quantitative evaluation of the present embodiments in comparison to other approaches, these scenes may not necessarily reflect the complexities encountered in images captured in an unconstrained manner. Therefore, the dataset includes images captured in the wild (see the examples of FIGS. 9A to 9C).

The present embodiments were compared with six other contemporary reflection removal approaches; four single-image algorithms, LB14, WS16, ZN18, and YG18, and two motion-based multi-image algorithms, LB13 and GC14. For the single-image algorithms, default parameters were used, and the algorithm was fed the captured image as input. Since the two sub-aperture views are available from the DP sensor, and these are essentially two different viewpoints of the scene, the present embodiments were also compared against the multi-image methods of LB13 and GC14, which exploit motion cues for layer separation. For a fair comparison, their search space was restricted to pure translation instead of a full homography. The left and right DP views were provided as input to the multi-image approaches because the change in viewpoint is highest between these two images.

The results were quantitatively compared on the controlled dataset. Performance was evaluated using several metrics: (i) peak signal to noise ratio (PSNR) and (ii) structural similarity index (SSIM) are the two most commonly employed. Also used were (iii) local mean squared error as a similarity measure (sLMSE), (iv) normalized cross correlation (NCC), and (v) structure index (SI).

TABLE 1

| Method | PSNR (dB) | SSIM | sLMSE | NCC | SI |
|---|---|---|---|---|---|
| LB13 | 16.12 | 0.689 | 0.870 | 0.966 | 0.758 |
| GC14 | 16.02 | 0.798 | 0.888 | 0.945 | 0.496 |
| LB14 | 14.20 | 0.842 | 0.797 | 0.981 | 0.840 |
| WS16 | 16.62 | 0.836 | 0.884 | 0.975 | 0.837 |
| ZN18 | 15.57 | 0.797 | 0.867 | 0.979 | 0.818 |
| YG18 | 16.49 | 0.832 | 0.871 | 0.978 | 0.847 |
| Ours (system 100) | 19.45 | 0.883 | 0.946 | 0.982 | 0.870 |

TABLE 1 details the experimental performance of LB13, GC 14, LB14, WS16, ZN18, YG18, and the system 100 with the controlled dataset for the five error metrics. It can be observed that system 100 outperforms competing approaches by a sound margin on all metrics. The examples of FIGS. 8A to 8C show three respective representative examples from the controlled dataset with three different aperture settings. It can be noticed that the multi-image methods LB13 and GC14 do not perform well in general because both methods rely on large changes in viewpoint, whereas the baseline between the DP views is generally narrow. FIG. 8A shows an example captured at F13 aperture value. Although the background does not have a lot of texture, the reflection is sharp due to the narrow aperture, and ZN18 and YG18 have traces of reflection in the top right of the image. It can be observed from the zoomed-in regions in the middle row of FIG. 8A that LB14 and WS16 both also have residual reflection. In comparison, system 100 recovers both background and reflection (shown in the third row of FIG. 8A) more accurately.

In FIG. 8B, an example with a highly textured background as well as reflection captured at the F8 aperture is shown. Competing techniques erroneously removed either too little (left box, middle row, for LB14) or too much (right box, middle row, YG18) detail from the background, or miscalculated the overall contribution of the reflection layer. The output of the system 100 more closely matches the ground truth when compared to other algorithms. In FIG. 8C, a third example shot at the F4 aperture is shown, which is more challenging because although the reflection is blurred, it covers a significant portion of the heavily textured background. All methods suffer from a loss of detail in this case. However, the system 100 still produces a fairly good separation of the background and reflection layers.

FIGS. 9A to 9C show three implemented examples of the example experiment using the in-the-wild dataset. Since there is no ground truth, zoomed-in regions corresponding to background (right box) and reflection (left box) are shown for a visual comparison. An estimated background gradient map is also shown. It can be observed that the system 100 performs consistently well in comparison to the other approaches. In these examples, the parameter λ was fixed to 100 for all experiments. On a 3.10 GHz processor with 32 GB RAM, using MATLAB takes approximately 2 minutes to process an 800×800 image.

In some cases, the depth module 158 can determine a coarse depth map of the reflected scene. An example is demonstrated in FIGS. 10A to 10D. By subtracting out the estimated background from the left and right views, the depth module 158 can obtain the reflected scene as observed from the left and right views; for example, using the following (as described herein):

$$g_{LV} = \frac{b}{2} + r_{LV}, g_{RV} = \frac{b}{2} + r_{RV},$$

where $r_{LV}=W_{LV}f$, $r_{RV}=W_{RV}f$. Note that $r_{LV}$ and $r_{RV}$ are blurred reflection images as seen from the left and right views, respectively.

These two images can then be used to extract a depth map of the reflected scene following a disparity estimation technique. FIG. 10A shows an example input image, FIG. 10B shows an estimated background determined by the system 100, FIG. 10C shows an estimated reflection determined by the system 100, and FIG. 10D shows a depth map of the reflection layer determined by the system 100. In an example, the disparity estimation technique can include determining disparity by taking each non-overlapping 8×8 tile in the left view and searching a range of −3 pixels to 3 pixels in the right view. For each integer shift, the sum of squared differences (SSD) is determined. The minimum of these seven points are found and a quadratic to the SSD value is fit at the minimum and its two surrounding points. The location of the quadratic's minimum is used as the sub-pixel minimum. For each tile a confidence value is also determined based on several heuristics: the value of the SSD loss, the magnitude of the horizontal gradients in the tile, the presence of a close second minimum, and the agreement of disparities in neighboring tiles. The per-tile disparities and confidences can be upsampled to per-pixel disparities and confidences.

Using the present embodiments, the disparity estimation technique can be applied to gradients instead of images. Additionally, instead of having to employ several heuristics to determine confidence, the present embodiments can use confidence estimates that are based directly on the quadratic fit. In addition, instead of determining disparities and confidences per non-overlapping tile and then upsampling them to per-pixel, the present embodiments can directly determine disparities and confidences at each pixel location.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A method for reflection removal of an image from a dual-pixel sensor, the image comprising a left view and a right view, the method executed on one or more processors, the method comprising:
   receiving a first gradient of the left view and a second gradient of the right view;
   determining disparity between the first gradient and the second gradient using a sum of squared differences (SSD);
   determining a confidence value at each pixel using the SSD;
   determining a weighted gradient map using the confidence values;
   minimizing a cost function to estimate the background layer, the cost function comprising the weighted gradient map, wherein the image comprises the background layer combined with a reflection layer; and
   outputting at least one of the background layer and the reflection layer.

2. The method of claim 1, wherein determining the disparity comprises selecting a patch in the gradient of one of the views and performing a horizontal search over a range of pixels in the gradient of the other view.

3. The method of claim 2, wherein the horizontal search comprises a one-dimensional search.

4. The method of claim 1, wherein the sum of squared differences (SSD) is determined for each of a series of integer shifts in a predetermined range.

5. The method of claim 1, wherein the weighted gradient map at a given pixel is zero if the corresponding confidence value is less than or equal to a predetermined threshold.

6. The method of claim 1, further comprising determining a difference in sharpness between the background layer and the reflection layer by determining a probability distribution of gradients of the reflection layer.

7. The method of claim 6, further comprising determining a probability distribution of gradients of the background layer.

8. The method of claim 7, wherein the cost function comprises a product of the probabilities of the probability distribution of the gradients of the reflection layer and the probability distribution of the gradients of the background layer.

9. The method of claim 8, wherein the cost function comprises:

$$\operatorname{argmin}_b \{\|Db\|_p^p + \lambda \|CD(g-b)\|_2^2\},$$

wherein b is the background layer, g is the image, D are derivative filters, $\|Db\|_p^p$ is a matrix for the gradient distribution of the background layer, $\lambda$ is a parameter to control an amount of defocus blur in the reflection layer, and C is a matrix encoding the weighted gradient map of the background layer.

10. The method of claim 1, further comprising subtracting the background layer from the left view and the right view and determining a coarse depth map of the reflected layer by using the subtracted left view and the subtracted right view.

11. A system for reflection removal of an image from a dual-pixel sensor, the image comprising a left view and a right view, the system comprising one or more processors in communication with a memory storage, the one or more processors configured to execute:
   a gradient module to receive a first gradient of the left view and a second gradient of the right view;
   a comparison module to determine disparity between the first gradient and the second gradient using a sum of squared differences (SSD), determine a confidence value at each pixel using the SSD, and determine a weighted gradient map using the confidence values;
   a layer separation module to minimize a cost function to estimate the background layer, the cost function comprising the weighted gradient map, wherein the image comprises the background layer combined with a reflection layer; and
   an output module to output at least one of the background layer and the reflection layer.

12. The system of claim 11, wherein determining the disparity comprises selecting a patch in the gradient of the one of the views and performing a horizontal search over a range of pixels in the gradient of the other view.

13. The system of claim 12, wherein the horizontal search comprises a one-dimensional search.

14. The system of claim 11, wherein the sum of squared differences (SSD) is determined for each of a series of integer shifts in a predetermined range.

15. The system of claim 11, wherein the weighted gradient map at a given pixel is zero if the corresponding confidence value is less than or equal to a predetermined threshold.

16. The system of claim 11, wherein the layer separation module further determines a difference in sharpness between the background layer and the reflection layer by determining a probability distribution of gradients of the reflection layer.

17. The system of claim 16, wherein the layer separation module further determines a probability distribution of gradients of the background layer.

18. The system of claim 17, wherein the cost function comprises a product of the probabilities of the probability distribution of the gradients of the reflection layer and the probability distribution of the gradients of the background layer.

19. The system of claim 18, wherein the cost function comprises:

$$\mathrm{argmin}_b \{ \|Db\|_p^p + \lambda \|CD(g-b)\|_2^2 \},$$

wherein b is the background layer, g is the image, D are derivative filters, $\|Db\|_p^p$ is a matrix for the gradient distribution of the background layer, $\lambda$ is a parameter to control an amount of defocus blur in the reflection layer, and C is a matrix encoding the weighted gradient map of the background layer.

20. The system of claim 11, further comprising a depth module to subtract the background layer from the left view and the right view and determine a coarse depth map of the reflected layer by using the subtracted left view and the subtracted right view.

* * * * *